(12) United States Patent
Wigsten

(10) Patent No.: US 10,316,708 B2
(45) Date of Patent: Jun. 11, 2019

(54) FLEXIBLE MEMBER IN ELECTRIC PHASER ACTUATOR

(71) Applicant: BorgWarner Inc., Auburn Hills, MI (US)

(72) Inventor: Mark M. Wigsten, Lansing, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 100 days.

(21) Appl. No.: 15/306,504

(22) PCT Filed: Apr. 22, 2015

(86) PCT No.: PCT/US2015/026979
§ 371 (c)(1),
(2) Date: Oct. 25, 2016

(87) PCT Pub. No.: WO2015/171308
PCT Pub. Date: Nov. 12, 2015

(65) Prior Publication Data
US 2017/0051641 A1 Feb. 23, 2017

Related U.S. Application Data

(60) Provisional application No. 61/988,599, filed on May 5, 2014.

(51) Int. Cl.
*F01L 1/34* (2006.01)
*F01L 1/352* (2006.01)
*F16H 19/00* (2006.01)
*F01L 1/344* (2006.01)
*F01L 1/46* (2006.01)
*F16H 55/22* (2006.01)

(52) U.S. Cl.
CPC ............ *F01L 1/352* (2013.01); *F16H 19/001* (2013.01); *F01L 1/344* (2013.01); *F01L 1/46* (2013.01); *F01L 2820/032* (2013.01); *F16H 55/22* (2013.01)

(58) Field of Classification Search
CPC ..... F01L 1/352; F01L 2820/032; F01L 1/344; F01L 1/46; F16H 19/001; F16H 55/22
See application file for complete search history.

(56) References Cited

U.S. PATENT DOCUMENTS 8,327,815 B2 * 12/2012 Hale ................. F01L 1/352
123/90.17
2013/0032112 A1 * 2/2013 Sisson ................ F01L 1/047
123/90.17

\* cited by examiner

*Primary Examiner* — Zelalem Eshete

(57) ABSTRACT

A number of variations may include a product comprising a flexible member for an electric phaser actuator comprising: a plate, wherein the plate comprises a body; wherein the body has a thickness which is less than a width and a height of the body and wherein the body is constructed and arranged to attach to an output gear of an electric phaser actuator and wherein the body is constructed and arranged to mate with an input gear on a camshaft phaser.

18 Claims, 4 Drawing Sheets

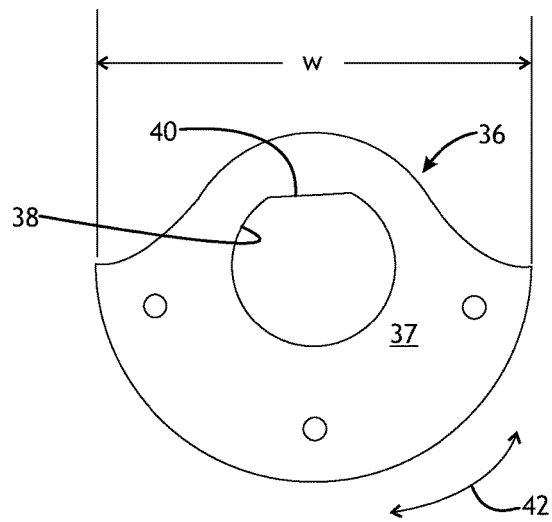
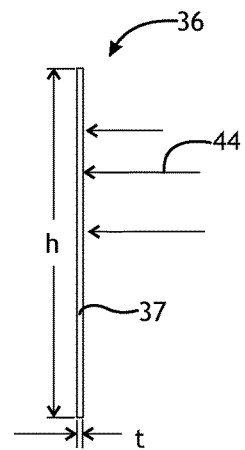
Fig.5  Fig.6
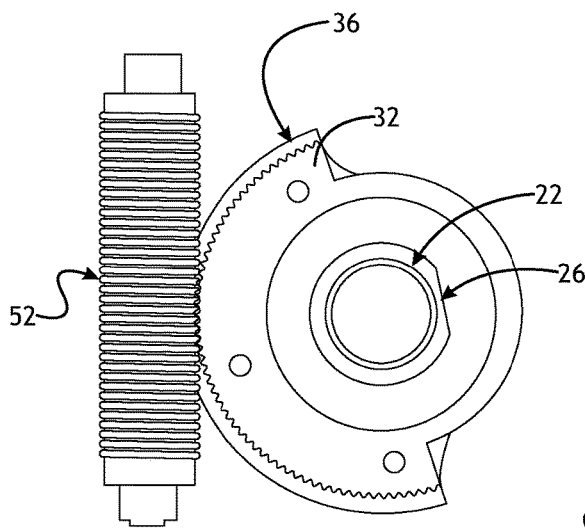
Fig.7
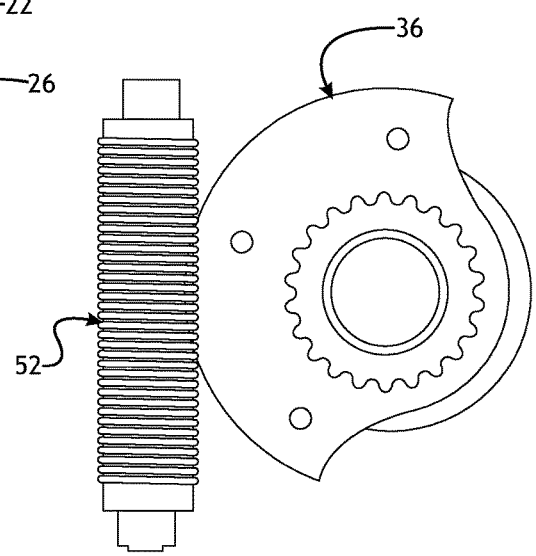
Fig.8

FLEXIBLE MEMBER IN ELECTRIC PHASER ACTUATOR

CROSS-REFERENCE TO RELATED APPLICATIONS

This application claims the benefit of U.S. Provisional Application No. 61/988,599 filed May 5, 2014.

TECHNICAL FIELD

The field to which the disclosure generally relates to includes camshaft phasers.

BACKGROUND

An engine may include a camshaft phaser.

SUMMARY OF ILLUSTRATIVE VARIATIONS

One variation may include a product comprising a flexible member for an electric phaser actuator comprising: a plate, wherein the plate comprises a body; wherein the body has a thickness which is less than a width and a height of the body and wherein the body is constructed and arranged to attach to an output gear of an electric phaser actuator and wherein the body is constructed and arranged to mate with an input gear on a camshaft phaser.

Another variation may include a method comprising compensating for perpendicular and axial misalignment between an electric camshaft actuator with a camshaft phaser comprising: providing a flexible member in an electric camshaft actuator; operatively coupling the flexible member with a camshaft phaser; transmitting a torque from an output gear in the electric camshaft actuator to an input gear in the camshaft phaser with the flexible member; and compensating for perpendicular and axial misalignment between the electric camshaft actuator to the camshaft phaser with the flexible member.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 5 illustrates a top view of a flexible member according to a number of variations.

FIG. 6 illustrates a side view of a flexible member according to a number of variations.

FIG. 7 illustrates a bottom view of a flexible member and an output gear interface according to a number of variations.

FIG. 8 illustrates a top view of a flexible member and an input gear interface according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 1:
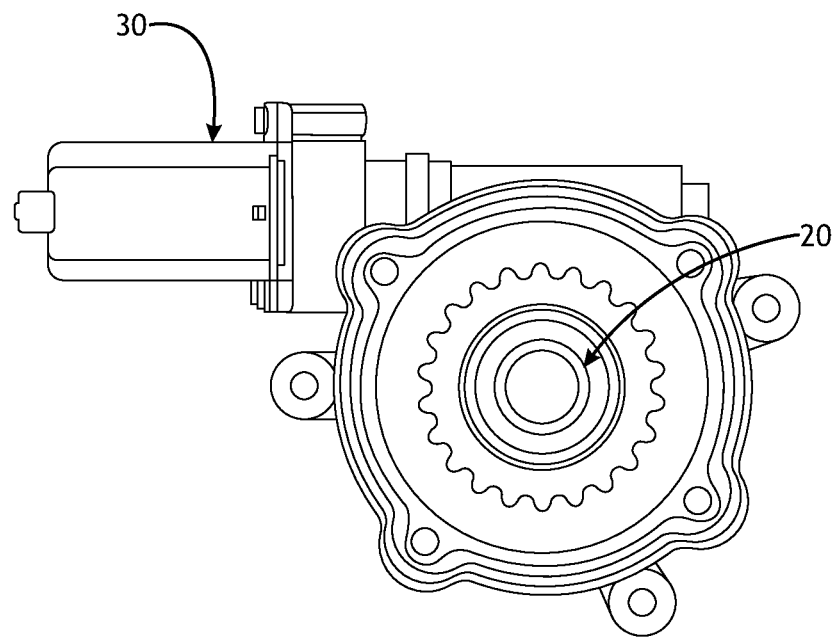
FIG. 1 illustrates a top view of a camshaft phaser and electric actuator according to a number of variations.
Figure 2:
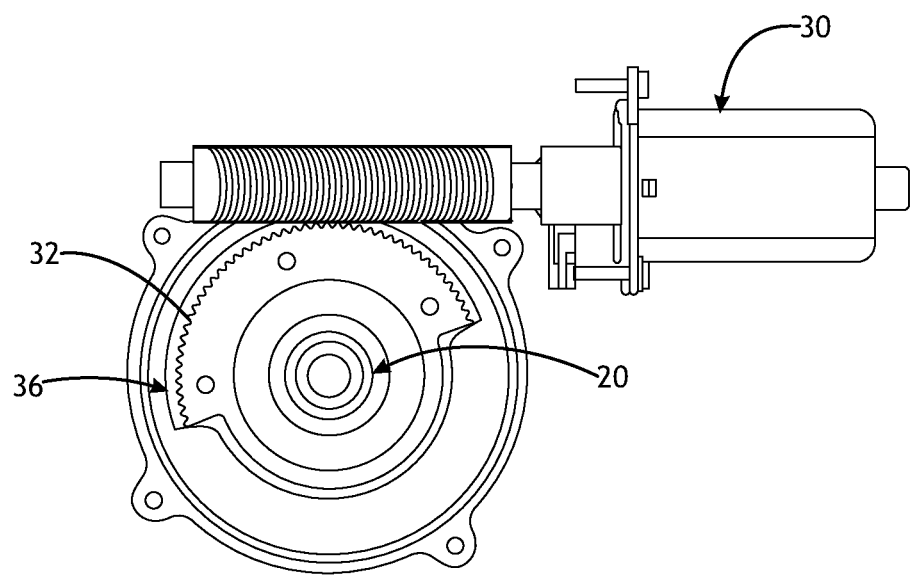
FIG. 2 illustrates a bottom view of a camshaft phaser and electric actuator according to a number of variations.
Figure 3:
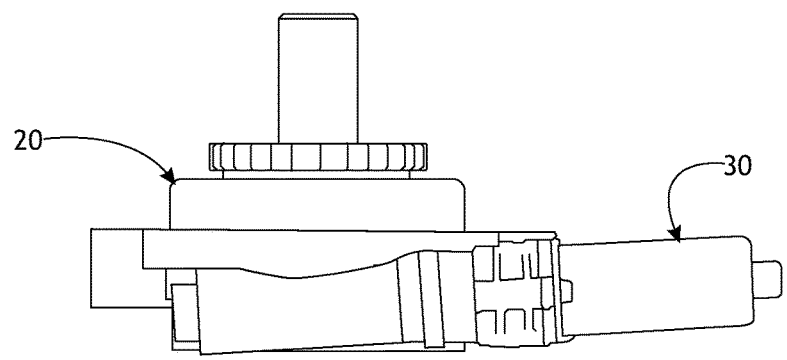
FIG. 3 illustrates a side view of a camshaft phaser and electric actuator according to a number of variations.
Figure 4:
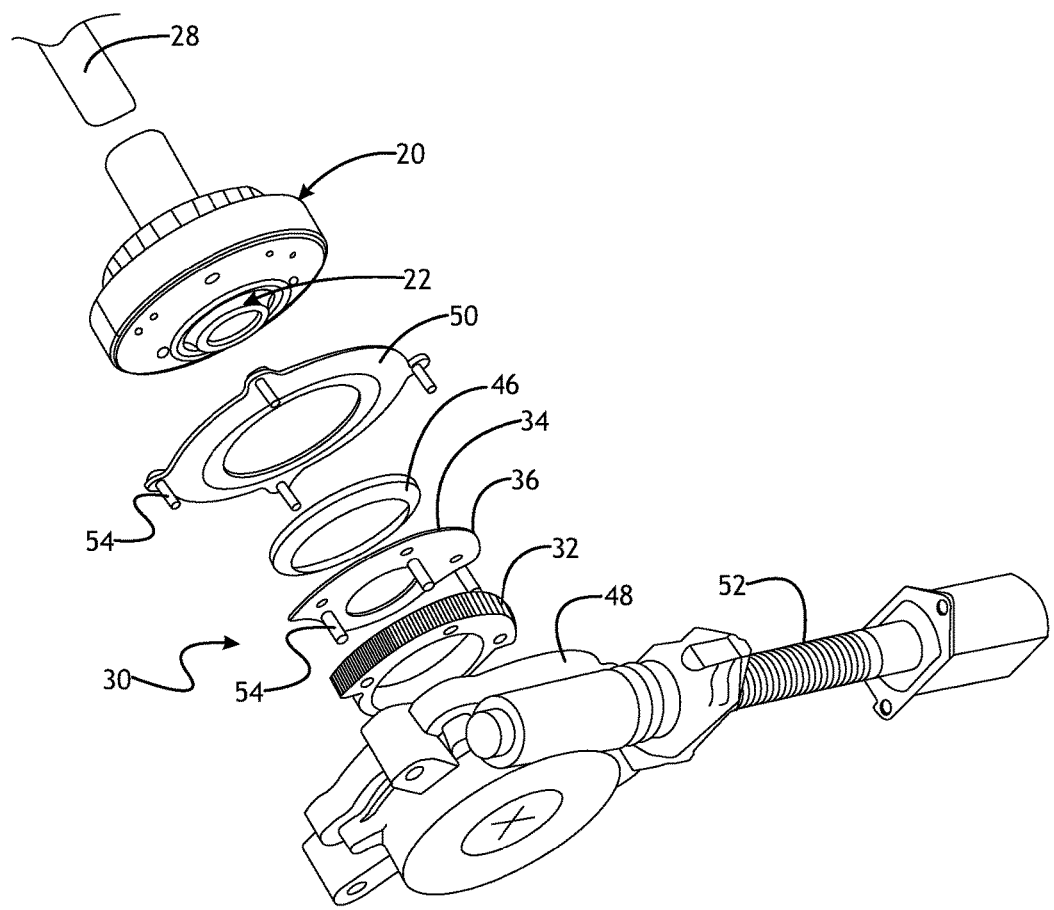
FIG. 4 illustrates an exploded view of a camshaft phaser and electric actuator according to a number of variations.
Figure 9:
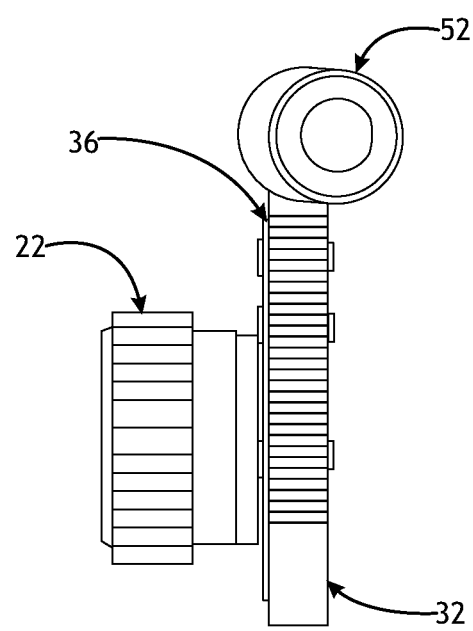
FIG. 9 illustrates a side view of an input gear, flexible member, and an output gear interface according to a number of variations.

Referring to FIGS. 1-4, in a number of variations, a camshaft phaser 20 may be used to control the rotation of a camshaft 28 (a variation of which is illustrated in FIG. 4) in relation to a vehicle's timing chain. An electric actuator 30 may be operatively connected to the camshaft phaser 20 and may be used to control the position and the timing of the camshaft phaser 20. The electric actuator 30 may be operatively connected to an electronic control unit (ECU) to control the camshaft phaser 20.

In a number of variations, an ECU may include a main controller and/or a control subsystem which may include one or more controllers in communication with the components of the system and/or other components of the vehicle for receiving and processing sensor input and transmitting output signals. The controller(s) may include one or more suitable processors and memory devices. The memory may be configured to provide storage of data and instructions that provide at least some of the functionality of the engine system and that may be executed by the processor(s). At least portions of the method may be enabled by one or more computer programs and various engine system data or instructions, electric camshaft phaser actuator 30 operating condition data stored in memory as look-up tables, formulas, algorithms, maps, models, or the like. The control subsystem may control the electric camshaft phaser actuator 30 parameters or parameters of the system by receiving input signals from the sensors, executing instructions or algorithms in light of sensor input signals, and transmitting suitable output signals to the various actuators, and/or components. As used herein, the term "model" may include any construct that represents something using variables, such as a look up table, map, formula, algorithm and/or the like. Models may be application specific and particular to the exact design and performance specifications of any given engine system or of the system. A controller system main controller and/or a control subsystem may include one or more controllers in communication with the components of the system and/or other components of the vehicle for receiving and processing sensor input and transmitting output signals and may be operatively connected to the electric camshaft phaser actuator 30, for example, in a method consistent with the illustrated variations described herein In a number of variations, the central axis of the camshaft phaser 20 may need to be perpendicular to the electric actuator 30 mounting plane in order for the camshaft phaser 20 to function properly. In a number of variations, a flexible member 36 may be constructed and arranged to compensate for any perpendicular and/or axial misalignment between any number of electric camshaft phaser actuators 30 known to those skilled in the art with any number of camshaft phasers 20 known to those skilled in the art, as will be discussed hereafter.

FIGS. 4-9 illustrate a number of variations. In one variation a camshaft phaser 20 may include an input gear 22 including, but not limited to, a sun gear, which may be operatively connected to an output gear 32 including, but not limited to, a sector gear, on the electric actuator 30 as will be discussed hereafter.

In a number of variations, an electric camshaft phaser actuator 30 may comprise a motor which may comprise a flexible member 36 positioned adjacent an output gear 32. In a number of variations, a seal 46 may also be positioned adjacent the flexible member 36. The flexible member 36 may be rigidly attached to the output gear 32 in a number of variations including, but not limited to, one or more mechanical fasteners 54 such as a bolt or a rivet, a variation of which is illustrated in FIG. 4. The flexible member 36, output gear 32, and seal 46 may be positioned within an actuator housing 48. The output gear 32 may be constructed and arranged to transfer rotational force to the input gear 22 to drive the input gear 22 in the camshaft phaser 20. A cover plate 50 may be attached to the housing 48 and may secure the components inside of the housing 48. The cover plate 50 may be attached to the housing in any number of variations including, but not limited to, one or more mechanical fasteners 54, a variation of which is illustrated in FIG. 4. A worm gear 52 may be operatively connected to the output gear 32 and may be used to rotate the output gear 32. The worm gear 52 may be controlled by the ECU.

In a number of variations, the flexible member 36 may be used to compensate for perpendicular and axial misalignment between the output gear 32 and the input gear 22. The flexible member 36 may be constructed and arranged to couple the electric actuator 30 with the camshaft phaser 20 and to transmit torque from the output gear 32 to the input gear 22. In a number of variations, the flexible member 36 may be constructed and arranged so that it may be torsionally stiff in a rotational direction 42 about its central axis, a variation of which is illustrated in FIG. 5, and so that it may be flexible in an axial direction 44, a variation of which is illustrated in FIG. 6, which may compensate for any perpendicular and/or axial misalignment between the output gear 32 and the input gear 22. The flexible member 36 may prevent or reduce high internal friction in the gear drive inside the electric actuator 30 and/or between the actuator output gear 32 and the camshaft phaser input gear 22.

In a number of variations, the flexible member 36 may be configured to have a similar shape to the output gear 32. The flexible member 36 may include a body 37 which has a thickness t less than the width w and height h of the body 37, a variation of which is illustrated in FIGS. 5 and 6. In one variation, the flexible member 36 may comprise a plate having a circular bell-like shape, a variation of which is illustrated in FIG. 5. The flexible member 36 may be constructed and arranged to cover at least a portion of the top surface 34 (a variation of which is illustrated in FIG. 7) of the output gear 32, a variation of which is illustrated in FIG. 7. In one variation, the flexible member 36 may cover the entire top surface 34 of the output gear 32. The flexible member 36 may be mechanically attached to the input gear 22 in any number of variations including, but not limited to, mechanical fasteners and/or a locking fit. In a number of variations, the flexible member 36 may include an inner cutout 38 in its body 37 which may be constructed and arranged to mate with the camshaft phaser input gear 22, a variation of which is illustrated in FIG. 5. The inner cutout 38 may also include a locking feature 40 including, but not limited to, a flat edge on the cutout 38 which may lock with a locking feature 26 on the input gear 22 which may include, but is not limited to, a flat edge on the input gear 22. The locking features 26, 40 may allow the rotation of the output gear 32 to be transferred to the camshaft phaser input gear 22, a variation of which is illustrated in FIG. 7.

The flexible member 36 may comprise any number of metallic materials including, but not limited to, steel. In a number of variations, the flexible member 36 may be a single unitary component, may comprise a plurality of components assembled together, or may comprise a plurality of individual components. The flexible member 36 may be planar or non-planar.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a flexible member for an electric phaser actuator comprising: a plate, wherein the plate comprises a body; wherein the body has a thickness which is less than a width and a height of the body and wherein the body is constructed and arranged to attach to an output gear of an electric phaser actuator and wherein the body is constructed and arranged to mate with an input gear on a camshaft phaser.

Variation 2 may include a product as set forth in Variation 1 wherein the output gear is a sector gear and the input gear is a sun gear.

Variation 3 may include a product as set forth in any of Variations 1-2 wherein the flexible member is constructed and arranged to couple an electric actuator with a camshaft phaser and to compensate for perpendicular and axial misalignment between the electric actuator and the camshaft phaser.

Variation 4 may include a product as set forth in any of Variations 1-3 wherein the body is mechanically attached to the input gear.

Variation 5 may include a product as set forth in any of Variations 1-4 wherein the flexible member is rigid in a rotational direction and flexible in an axial direction.

Variation 6 may include a product as set forth in any of Variations 1-5 wherein the flexible member is a single unitary component.

Variation 7 may include a product as set forth in any of Variations 1-5 wherein the flexible member comprises several components.

Variation 8 may include a product as set forth in any of Variations 1-7 further comprising an electric phaser actuator and a camshaft phaser, and wherein the flexible member compensates for perpendicular and axial misalignment between the electric phaser actuator and the camshaft phaser.

Variation 9 may include a product comprising: an electric camshaft phaser actuator comprising: a flexible member; an output gear adjacent a first side of the flexible member; a housing, wherein the flexible member and the output gear are located in the housing; a worm gear operatively connected to the output gear; and a cover plate, wherein the cover plate attaches to the housing.

Variation 10 may include a product as set forth in Variation 9 wherein the flexible member is constructed and arranged to compensate for perpendicular and axial misalignment between the electric camshaft phaser actuator with a camshaft phaser.

Variation 11 may include a product as set forth in any of Variations 9-10 wherein the flexible member is constructed and arranged to compensate for perpendicular and axial misalignment between the electric camshaft phaser actuator with the camshaft phaser by coupling an output gear on the electric camshaft phaser actuator with an input gear on the camshaft phaser.

Variation 12 may include a product as set forth in any of Variations 9-11 wherein the flexible member is torsionally stiff in a rotational direction and flexible in an axial direction.

Variation 13 may include a product as set forth in any of Variations 9-12 wherein the flexible member is rigidly attached to the output gear.

Variation 14 may include a product as set forth in any of Variations 9-13 wherein the flexible member is rigidly attached to the output gear by at least one mechanical fastener.

Variation 15 may include a product as set forth in any of Variations 9-14 wherein the flexible member is constructed and arranged to cover at least a portion of a top surface of the output gear.

Variation 16 may include a product as set forth in any of Variations 9-15 wherein the flexible member covers an entire top surface of the output gear.

Variation 17 may include a method comprising: compensating for perpendicular and axial misalignment between an electric camshaft actuator with a camshaft phaser comprising: providing a flexible member in an electric camshaft actuator; operatively coupling the flexible member with a camshaft phaser; transmitting a torque from an output gear in the electric camshaft actuator to an input gear in the camshaft phaser with the flexible member; and compensating for perpendicular and axial misalignment between the electric camshaft actuator to the camshaft phaser with the flexible member.

Variation 18 may include a method as set forth in Variation 17 wherein the flexible member is torsionally stiff in a rotational direction and flexible in an axial direction.

Variation 19 may include a method as set forth in any of Variations 17-18 wherein the flexible member is rigidly attached to the output gear.

Variation 20 may include a method as set forth in any of Variations 17-19 wherein the flexible member includes a first locking feature which is constructed and arranged to lock with a second locking feature on the input gear.

The above description of select variations within the scope of the invention is merely illustrative in nature and, thus, variations or variants thereof are not to be regarded as a departure from the spirit and scope of the invention.

What is claimed is:

1. A product comprising:
a flexible member for an electric phaser actuator comprising:
a plate, wherein the plate comprises a body, wherein the body has a thickness which is less than a width and a height of the body and wherein the flexible member is configured to couple with an output of an electric actuator that rotates bidirectionally about an axis to control the angular position of an input of an electric phaser and with the input of the electric phaser transmitting rotational force from the output to the input and permit angular or axial misalignment of the output relative to the input.

2. The product of claim 1 wherein the output is a sector gear and the input is a sun gear.

3. The product of claim 1 wherein the body is mechanically attached to the input.

4. The product of claim 1 wherein the flexible member is rigid in a rotational direction and flexible in an axial direction.

5. The product of claim 1 wherein the flexible member is a single unitary component.

6. The product of claim 1 wherein the flexible member comprises several components.

7. The product of claim 1 further comprising an electric phaser actuator and a camshaft phaser, and wherein the flexible member compensates for perpendicular and axial misalignment between the electric phaser actuator and the camshaft phaser.

8. A product comprising:
an electric camshaft phaser actuator comprising:
a flexible member, configured to couple to an input of an electric phaser and transmit rotational force from an output gear of an electric actuator to the input, and permitting angular or axial misalignment of the output gear relative to the input;
the output gear coupled to a first side of the flexible member and rotating bidirectionally about an axis to control the angular position of the input of the electric phaser;
a housing, wherein the flexible member and the output gear are located in the housing;
a worm gear operatively connected to the output gear; and
a cover plate, wherein the cover plate attaches to the housing.

9. The product of claim 8 wherein the flexible member is constructed and arranged to compensate for perpendicular and axial misalignment between the electric camshaft phaser actuator with a camshaft phaser.

10. The product of claim 8 wherein the flexible member is torsionally stiff in a rotational direction and flexible in an axial direction.

11. The product of claim 8 wherein the flexible member is rigidly attached to the output gear.

12. The product of claim 11 wherein the flexible member is rigidly attached to the output gear by at least one mechanical fastener.

13. The product of claim 8 wherein the flexible member is constructed and arranged to cover at least a portion of a top surface of the output gear.

14. The product of claim 13 wherein the flexible member covers an entire top surface of the output gear.

15. A method of compensating for angular and axial misalignment between an electric camshaft actuator and an electric camshaft phaser comprising:
providing a flexible member in an electric camshaft actuator;
operatively coupling the flexible member with an input of the electric camshaft phaser and an output of the electric camshaft actuator that rotates bidirectionally about an axis to control the angular position of the input of the electric phaser, wherein the flexible member permits angular or axial misalignment of the input relative to the output; and
transmitting a torque from the output of the electric camshaft actuator to an input of the electric camshaft phaser through the flexible member.

16. The method of claim 15 wherein the flexible member is torsionally stiff in a rotational direction and flexible in an axial direction.

17. The method of claim 15 wherein the flexible member is rigidly attached to the output.

18. The method of claim 15 wherein the flexible member includes a first locking feature which is constructed and arranged to lock with a second locking feature on the input.

* * * * *